March 3, 1959

F. F. MILLER, JR 2,875,600

CONSTANT VELOCITY UNIVERSAL JOINT

Filed Dec. 19, 1957

INVENTOR.
FRED F. MILLER JR.
BY
*Whittemore, Hulbert & Belknap*
ATTORNEYS

United States Patent Office 2,875,600
Patented Mar. 3, 1959

2,875,600

CONSTANT VELOCITY UNIVERSAL JOINT

Fred F. Miller, Jr., Berkley, Mich.

Application December 19, 1957, Serial No. 703,953

7 Claims. (Cl. 64—21)

This invention relates to universal joints and refers more particularly to constant velocity universal joints of the type comprising spherically engaged inner and outer members coupled together by a series of balls engaging registering arcuate meridian race grooves in the members.

In a joint of this type, the relative speed of rotation of the drive and driven members remains always the same in whatever position of angular adjustment between the axes of rotation of the two members. This is dependent upon maintaining the plane of the balls so as to bisect the angle between the axes of the members in all working positions of the members. At the present time, this is accomplished by a groove development which develops all outer race grooves from a single center at one side of the intersection between the axes of rotation of the members, and which develops all inner race grooves from a center at the opposite side of and spaced an equal distance from said intersection. This practice of groove development though it maintains the ball cage in its correct geometric position causes an unbalanced force due to the centrifugal force of the balls in the off-center grooves which produces end thrust or axial thrust on the spherical surfaces of the ball cage and mating surfaces. At high speed, these forces are considerable and cause excessive heat, seizure and failure of the joint.

It is the object of this invention to provide a constant velocity universal joint in which the resultant end thrusts or forces balance each other, and in particular to accomplish this result by a novel ball groove development.

Other objects and features of the invention will become apparent as the description proceeds, especially when taken in conjunction with the accompanying drawing, illustrating a preferred embodiment of the invention, wherein.

Figure 1:
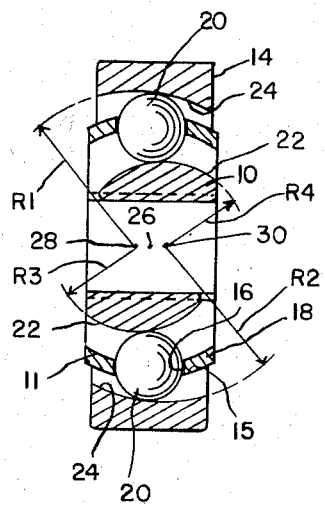
Fig. 1 is a longitudinal sectional view through a universal joint embodying the invention, taken on the line 1—1 of Fig. 2.
Figure 2:
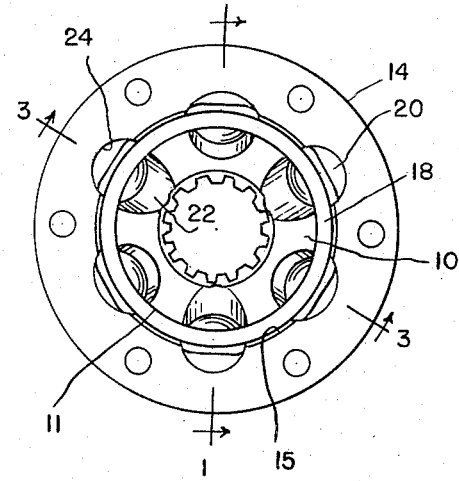
Fig. 2 is an end view of the joint.
Figure 3:
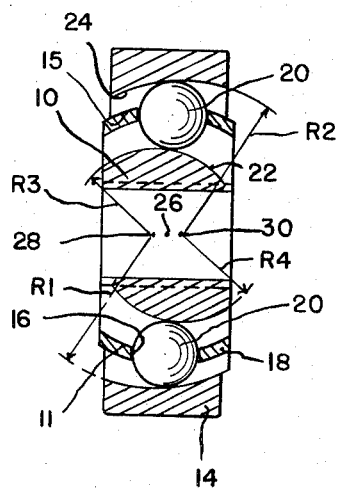
Fig. 3 is a longitudinal sectional view taken on the line 3—3 of Fig. 2.

Referring now more particularly to the drawing, the inner spherical member 10 has an external spherical surface 11 and is internally splined for connection to a shaft. The outer spherical member 14 has an internal spherical surface 15 and also is adapted to be connected to a shaft. A spherical cage member 18 is interposed between the members 10 and 14. Balls 20 engage within segmental circumferentially spaced slots 16 in the cage member, and also engage the registering arcuate meridian ball race grooves 22 and 24 in the inner and outer members.

The engaging spherical surfaces of the members 10, 14 and 18 are all concentric with respect to the point 26, which is the fixed intersection between the axes of rotation of the members 10 and 14 in any relative angular position of these axes.

Alternate grooves in the outer race member are concentric with the point 28 which lies on the coincident axes of rotation of the members 10 and 14 in the position of alignment of said axes, at one side of the fixed intersection 26. The remaining ball race grooves of the outer member are concentric with the point 30 which lies on the coincident axes of rotation of the members in the position of alignment of said axes, at the opposite side of and spaced an equal distance from the fixed intersection 26. The radius of the alternate grooves is indicated by R1 and of the remaining grooves by R2.

The grooves in the inner member which register with the alternate grooves of the outer member are concentric with the point 30, and the remaining grooves of the inner member are concentric with the point 28. The radii of these grooves are indicated by the letters R4 and R3, respectively.

The registering grooves thus are not concentric but diverge from one another, half the sets of registering grooves diverging in one axial direction and the remaining sets diverging in the other axial directon. Thus the registering grooves at the top of Fig. 1 will produce an end thrust on the ball and cage to the left, whereas the registering grooves at the bottom of the figure produce an end thrust to the right. This is in contrast to prior constructions in which all sets of registering grooves diverge in the same direction and hence produce an end thrust in the same direction. In accordance with this improved construction, three sets of registering grooves produce an end thrust in one direction and the other three produce an end thrust in the opposite direction. Therefore, the end thrusts balance each other with the result that there is substantially no resultant end thrust in the joint.

The joint is therefore capable of increased speed of operation without the accompanying generation of heat and possible failure that exists with prior constructions.

What I claim as my invention is:

1. In a universal joint of the type comprising inner and outer members relatively angularly movable about a fixed intersection in their rotational axes and having arcuate meridian ball race grooves therein, balls engaging said grooves, means operating during relative angular movement of the rotational axes of said members for positively moving said balls so that the plane thereof always bisects the angle between said axes, said means comprising surfaces in registering grooves of said inner and outer members, the surfaces in certain sets of registering grooves in position of axial alignment of said members diverging in one axial direction and being concentric to points in said axes equally spaced from and on opposite sides of said fixed intersection, and the surfaces in the remaining sets of registering grooves in position of axial alignment of said members diverging in the opposite axial direction and being concentric to points in said axes equally spaced from and on opposite sides of said fixed intersection.

2. A universal joint as defined in claim 1 in which a cage is provided between said inner and outer members and said balls are mounted in said cage.

3. A universal joint as defined in claim 2 in which the ponts at one side of said fixed intersection coincide and those at the other side thereof also coincide.

4. A universal joint as defined in claim 3 in which the number of remaining sets of registering grooves is one-half the total number of sets of registering grooves.

5. In a universal joint of the type comprising inner and outer members relatively angularly movable about a fixed intersection in their rotational axes and having arcuate meridian ball race grooves therein, an intermediate cage and balls mounted in said cage and engaging said grooves, means operating during relative angular movement of the rotational axes of said members for positively moving said balls so that the plane thereof always bisects the angle between said axes, said means comprising surfaces in registering grooves of said inner and outer members, the surfaces in each alternate set of registering grooves in position of axial alignment of said members diverging in one axial direction and being concentric to points in said axes equally spaced from and on opposite sides of said fixed intersection, and the surfaces in the remaining sets of registering grooves in position of axial alignment of said members diverging in the opposite axial direction and being concentric to points in said axes equally spaced from and on opposite sides of said fixed intersection, the points at one side of said fixed intersection being coincident and those at the other side thereof being coincident.

6. In a universal joint of the type comprising inner and outer members relatively angularly movable about a fixed intersection in their rotational axes and having arcuate meridian ball race grooves and balls engaging said grooves, means operating during relative angular movement of the rotational axes of said members for positively moving said balls so that the plane thereof always bisects the angle between said axes, said means comprising inner and outer surfaces on said inner and outer members respectively operatively associated with certain of said balls, said inner and outer surfaces in position of axial alignment of said members diverging in one axial direction and being concentric to points in said axes equally spaced from and on opposite sides of said fixed intersection, additional inner and outer surfaces on said inner and outer members respectively operatively associated with certain other of said balls, said additional inner and outer surfaces in position of axial alignment of said members diverging in the opposite axial direction and being concentric to points in said axes equally spaced from and on opposite sides of said fixed intersection.

7. A universal joint as defined in claim 1 in which the points on one side of said fixed intersection are coincident and the points on the opposite side of said fixed intersection are coincident in the position of alignment of said members.

References Cited in the file of this patent
UNITED STATES PATENTS

| | | |
|---|---|---|
| 1,975,758 | Stuber | Oct. 2, 1934 |
| 2,046,584 | Rzeppa | July 7, 1936 |
| 2,319,100 | Anderson | May 11, 1943 |
| 2,322,570 | Dodge | June 22, 1943 |

FOREIGN PATENTS

| | | |
|---|---|---|
| 637,780 | Great Britain | May 24, 1950 |